US011949155B2

(12) United States Patent
Jung et al.

(10) Patent No.: US 11,949,155 B2
(45) Date of Patent: Apr. 2, 2024

(54) ANTENNA MODULE

(71) Applicant: AMOTECH CO., LTD., Incheon (KR)

(72) Inventors: Hongdae Jung, Incheon (KR); Yunsik Seo, Incheon (KR); Hyungil Baek, Incheon (KR); Hyunjoo Park, Incheon (KR)

(73) Assignee: AMOTECH CO., LTD., Incheon (KR)

(*) Notice: Subject to any disclaimer, the term of this patent is extended or adjusted under 35 U.S.C. 154(b) by 226 days.

(21) Appl. No.: 17/773,580

(22) PCT Filed: Oct. 19, 2020

(86) PCT No.: PCT/KR2020/014245
§ 371 (c)(1),
(2) Date: Apr. 29, 2022

(87) PCT Pub. No.: WO2021/085910
PCT Pub. Date: May 6, 2021

(65) Prior Publication Data

US 2022/0368013 A1 Nov. 17, 2022

(30) Foreign Application Priority Data

Oct. 31, 2019 (KR) ........................ 10-2019-0138168

(51) Int. Cl.
*H01Q 1/52* (2006.01)
*H01Q 1/48* (2006.01)

(52) U.S. Cl.
CPC ............... *H01Q 1/523* (2013.01); *H01Q 1/48* (2013.01)

(58) Field of Classification Search
CPC ............ H01Q 1/38; H01Q 1/243; H01Q 1/48; H01Q 7/00; H01Q 9/0407; H01Q 1/36;
(Continued)

(56) References Cited

U.S. PATENT DOCUMENTS 7,352,328 B2 4/2008 Moon et al.
11,201,416 B2 * 12/2021 Hashiguchi ............ H01Q 23/00
(Continued)

FOREIGN PATENT DOCUMENTS

JP 2005-124056 A 5/2005
KR 10-0699472 B1 3/2007
(Continued)

OTHER PUBLICATIONS

Korean Office Action from corresponding KR Application No. 10-2019-0138168, dated Sep. 25, 2021.
(Continued)

*Primary Examiner* — Monica C King
(74) *Attorney, Agent, or Firm* — Maschoff Brennan

(57) ABSTRACT

Suggested is an antenna module which maximizes a characteristic of isolation between two radiation patterns located adjacent to each other by forming a ground wall, by means of through-holes, at the radiation patterns. The suggested antenna module comprises: a first radiation pattern disposed on the upper surface of a base substrate; a second radiation pattern disposed on the upper surface of the base substrate while being spaced away from the first radiation pattern; a plurality of first through-holes arranged in parallel with one side of the first radiation pattern facing the second radiation pattern; and a plurality of second through-holes arranged in parallel with one side of the second radiation pattern facing the first radiation pattern.

10 Claims, 7 Drawing Sheets

(58) Field of Classification Search
CPC ........ H01Q 21/28; H01Q 1/50; H01Q 21/065; H01Q 9/0421; H01Q 9/42; H01Q 1/2283; H01Q 1/24; H01Q 13/10; H01Q 21/24; H01Q 1/42; H01Q 1/22; H01Q 23/00; H01Q 1/2225; H01Q 9/0414; H01Q 1/246; H01Q 5/371; H01Q 9/285; H01Q 21/064; H01Q 1/273; H01Q 21/08; H01Q 1/44; H01Q 1/40; H01Q 21/30; H01Q 13/08; H01Q 21/061; H01Q 21/0006; H01Q 9/0442; H01Q 9/40; H01Q 1/526; H01Q 1/521; H01Q 9/045; H01Q 1/52; H01Q 9/16; H01Q 1/3275; H01Q 21/0087; H01Q 21/00; H01Q 1/2208; H01Q 5/378; H01Q 9/0457; H01Q 13/106; H01Q 1/12; H01Q 9/30; H01Q 5/40; H01Q 7/06; H01Q 1/2291; H01Q 9/28; H01Q 1/2216; H01Q 21/062; H01Q 1/523; H01Q 1/242; H01Q 13/02; H01Q 15/14; H01Q 1/32; H01Q 21/0075; H01Q 21/0025; H01Q 19/10; H01Q 11/08; H01Q 15/0086; H01Q 1/3233; H01Q 3/26; H01Q 9/04; H01Q 21/06; H01Q 1/2266; H01Q 9/0485; H01Q 5/50; H01Q 21/26; H01Q 13/18; H01Q 9/26; H01Q 1/241; H01Q 9/0428; H01Q 9/065; H01Q 21/29; H01Q 9/27; H01Q 5/10; H01Q 1/02; H01Q 3/24; H01Q 1/362; H01Q 3/36; H01Q 1/1207; H01Q 21/205; H01Q 5/307; H01Q 1/1271; H01Q 15/08; H01Q 7/08; H01Q 5/364; H01Q 5/357; H01Q 19/005; H01Q 19/06; H01Q 3/46; H01Q 9/0435; H01Q 21/005; H01Q 5/35; H01Q 5/00; H01Q 1/46; H01Q 15/006; H01Q 19/062; H01Q 1/125; H01Q 3/44; H01Q 5/25; H01Q 5/335; H01Q 1/2258; H01Q 25/00; H01Q 3/34; H01Q 1/28; H01Q 3/08; H01Q 5/30; H01Q 13/085; H01Q 21/20; H01Q 5/42; H01Q 15/02; H01Q 1/288; H01Q 15/008; H01Q 25/001; H01Q 9/36; H01Q 19/108; H01Q 5/385; H01Q 5/20; H01Q 21/0037; H01Q 1/1214; H01Q 1/422; H01Q 1/245; H01Q 15/0013; H01Q 17/00; H01Q 1/3291; H01Q 19/30; H01Q 1/364; H01Q 9/0464; H01Q 13/06; H01Q 1/007; H01Q 15/24; H01Q 5/321; H01Q 5/328; H01Q 13/206; H01Q 21/0093; H01Q 1/244; H01Q 1/04; H01Q 13/103; H01Q 1/08; H01Q 1/525; H01Q 1/248; H01Q 21/22; H01Q 3/30; H01Q 3/04; H01Q 21/0031; H01Q 3/267; H01Q 19/08; H01Q 1/1242; H01Q 1/27; H01Q 21/245; H01Q 1/247; H01Q 13/22; H01Q 15/0026; H01Q 1/084; H01Q 13/16; H01Q 13/20; H01Q 25/005; H01Q 1/002; H01Q 1/1228; H01Q 3/32; H01Q 3/40; H01Q 13/28; H01Q 15/0066; H01Q 5/48; H01Q 9/0471; H01Q 1/3283; H01Q 1/00; H01Q 15/10; H01Q 19/104; H01Q 7/005; H01Q 21/0012; H01Q 1/286; H01Q 17/001; H01Q 5/28; H01Q 15/16; H01Q 1/1221; H01Q 9/14; H01Q 3/02; H01Q 1/405; H01Q 9/0492; H01Q 1/2241; H01Q 3/247; H01Q 19/13; H01Q 1/1235; H01Q 1/2275; H01Q 1/325; H01Q 19/106; H01Q 21/0043; H01Q 3/2676; H01Q 13/24; H01Q 15/0006; H01Q 19/18; H01Q 19/17; H01Q 5/314; H01Q 13/0258; H01Q 3/01; H01Q 9/32; H01Q 1/085; H01Q 9/145; H01Q 3/20; H01Q 3/2605; H01Q 13/00; H01Q 1/225; H01Q 15/002; H01Q 21/0018; H01Q 1/528; H01Q 19/19; H01Q 1/3241; H01Q 5/45; H01Q 1/34; H01Q 21/0081; H01Q 1/088; H01Q 9/06; H01Q 15/148; H01Q 19/185; H01Q 1/3208; H01Q 7/04; H01Q 1/3216; H01Q 3/00; H01Q 13/0283; H01Q 19/32; H01Q 5/342; H01Q 3/06; H01Q 15/161; H01Q 25/007; H01Q 5/392; H01Q 21/293; H01Q 3/28; H01Q 21/067; H01Q 1/18; H01Q 21/12; H01Q 1/20; H01Q 11/10; H01Q 13/0275; H01Q 19/09; H01Q 19/28; H01Q 9/265; H01Q 25/008; H01Q 21/068; H01Q 5/22; H01Q 1/26; H01Q 15/141; H01Q 19/00; H01Q 1/2233; H01Q 15/04; H01Q 3/242; H01Q 19/02; H01Q 5/15; H01Q 1/1264; H01Q 11/105; H01Q 3/14; H01Q 21/10; H01Q 3/22; H01Q 17/008; H01Q 1/366; H01Q 9/0478; H01Q 25/002; H01Q 15/242; H01Q 19/12; H01Q 5/55; H01Q 3/38; H01Q 9/18; H01Q 13/0233; H01Q 15/0053; H01Q 15/23; H01Q 3/245; H01Q 13/203; H01Q 21/0068; H01Q 15/18; H01Q 19/021; H01Q 19/24; H01Q 3/443; H01Q 25/02; H01Q 1/1285; H01Q 19/132; H01Q 3/005; H01Q 3/2658; H01Q 13/0208; H01Q 19/22; H01Q 1/005; H01Q 1/281; H01Q 1/425; H01Q 13/0241; H01Q 3/12; H01Q 1/1257; H01Q 15/00; H01Q 15/246; H01Q 1/06; H01Q 9/24; H01Q 19/065; H01Q 11/14; H01Q 13/12; H01Q 19/067; H01Q 25/04; H01Q 9/20; H01Q 1/421; H01Q 15/0093; H01Q 3/446; H01Q 1/285; H01Q 3/16; H01Q 13/26; H01Q 9/46; H01Q 9/44; H01Q 5/49; H01Q 7/02; H01Q 1/14; H01Q 1/428; H01Q 11/02; H01Q 3/2617; H01Q 11/04; H01Q 17/002; H01Q 9/38; H01Q 1/287; H01Q 3/18; H01Q 3/2647; H01Q 1/368; H01Q 1/424; H01Q 15/244; H01Q 3/2611; H01Q 3/2682; H01Q 13/065; H01Q 15/0046; H01Q 9/22; H01Q 11/12; H01Q 5/47; H01Q 1/10; H01Q 1/283; H01Q 15/142; H01Q 19/138; H01Q 13/04; H01Q 15/147; H01Q 9/00; H01Q 19/193; H01Q 11/083; H01Q 19/134; H01Q 19/175; H01Q 1/3225; H01Q 19/195; H01Q 19/26
See application file for complete search history.

(56) References Cited

U.S. PATENT DOCUMENTS

| | | | | | |
|---|---|---|---|---|---|
| 11,228,101 | B2 * | 1/2022 | Hashiguchi | .............. | H01Q 7/00 |
| 11,862,854 | B1 * | 1/2024 | Hassan | .................. | H01Q 9/045 |
| 2011/0148736 | A1 | 6/2011 | Choi et al. | | |

(56) References Cited

U.S. PATENT DOCUMENTS

2014/0203987 A1* 7/2014 Itoh ...................... H01Q 1/2266
343/866

FOREIGN PATENT DOCUMENTS

| | | | |
|---|---|---|---|
| KR | 10-2011-0040393 | A | 4/2011 |
| KR | 10-2011-0070426 | A | 6/2011 |
| KR | 10-2011-0123592 | A | 11/2011 |
| KR | 10-2012-0037763 | A | 4/2012 |

OTHER PUBLICATIONS

Korean Decision to Grant from corresponding KR Application No. 10-2019-0138168, dated Nov. 16, 2021.

* cited by examiner

[FIG. 1]
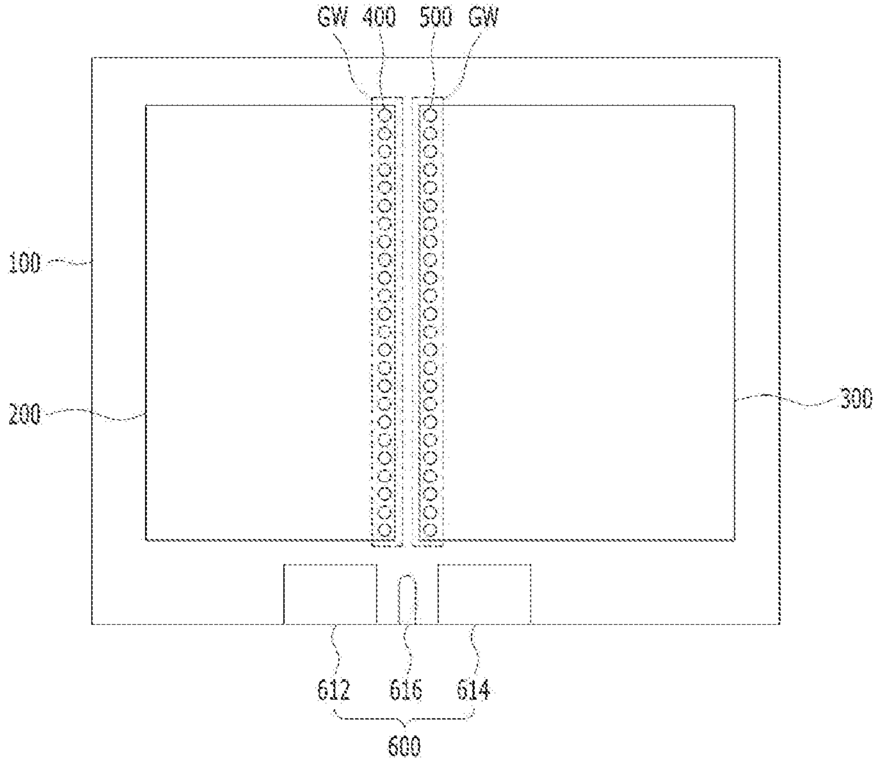

[FIG. 2]
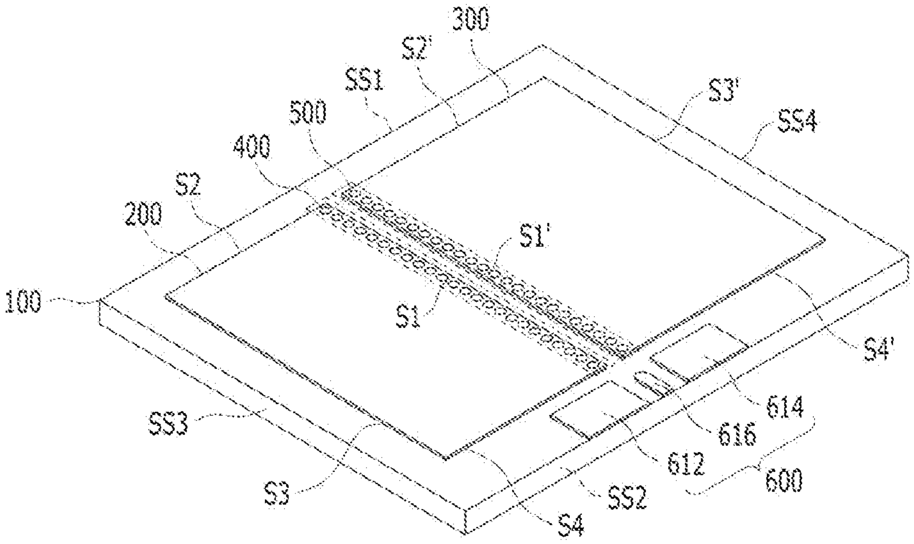
[FIG. 3]
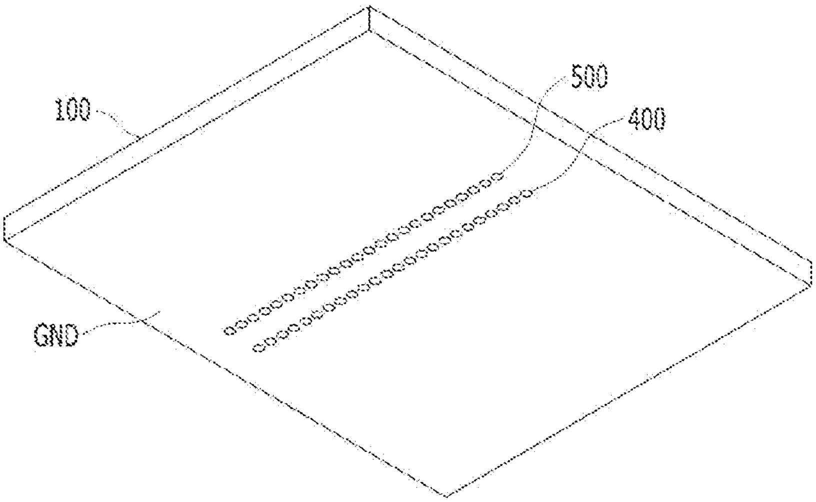

[FIG. 4]
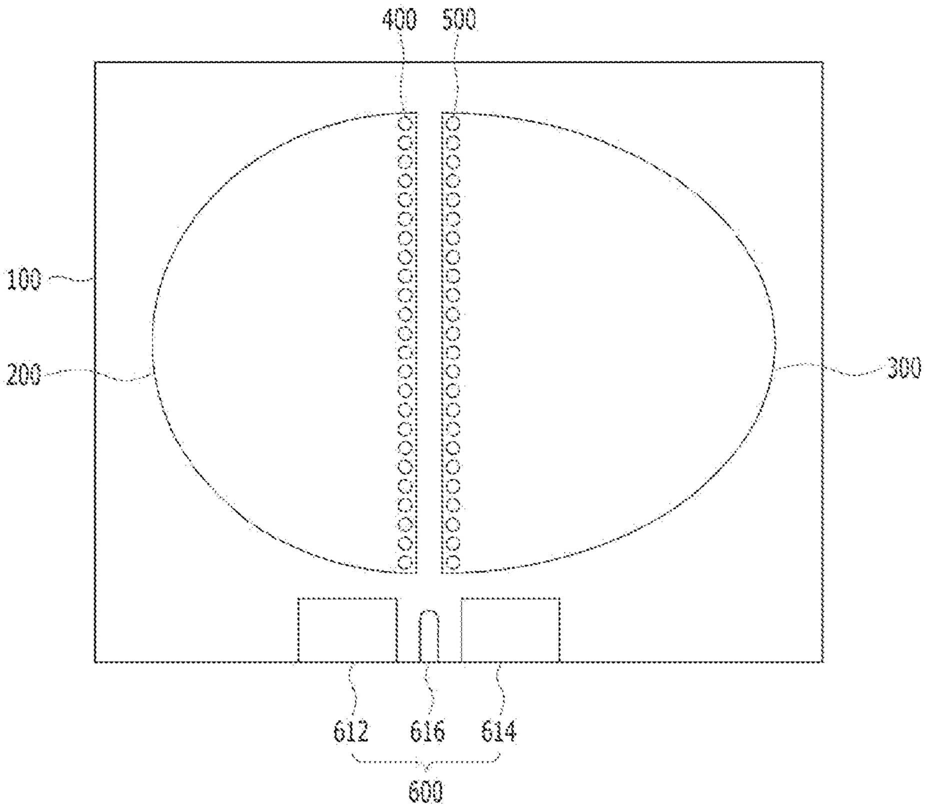

[FIG. 5]
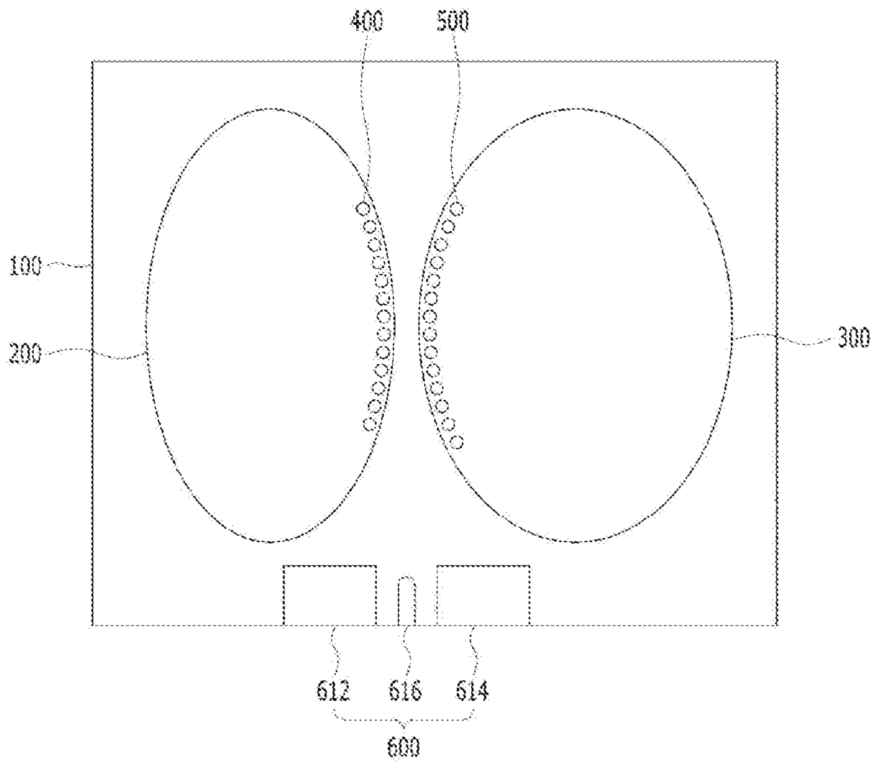

[FIG. 6]
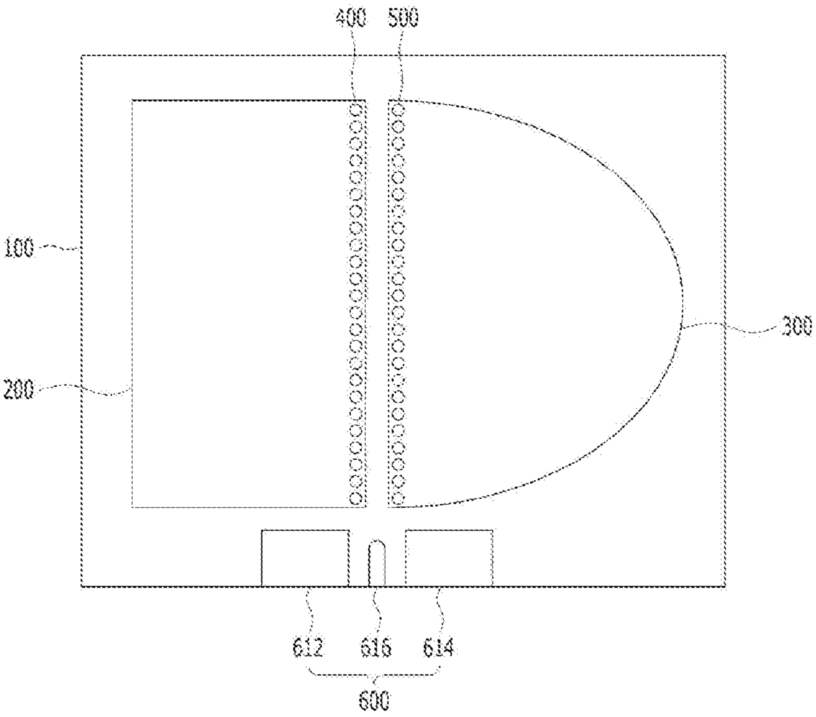

[FIG. 7]
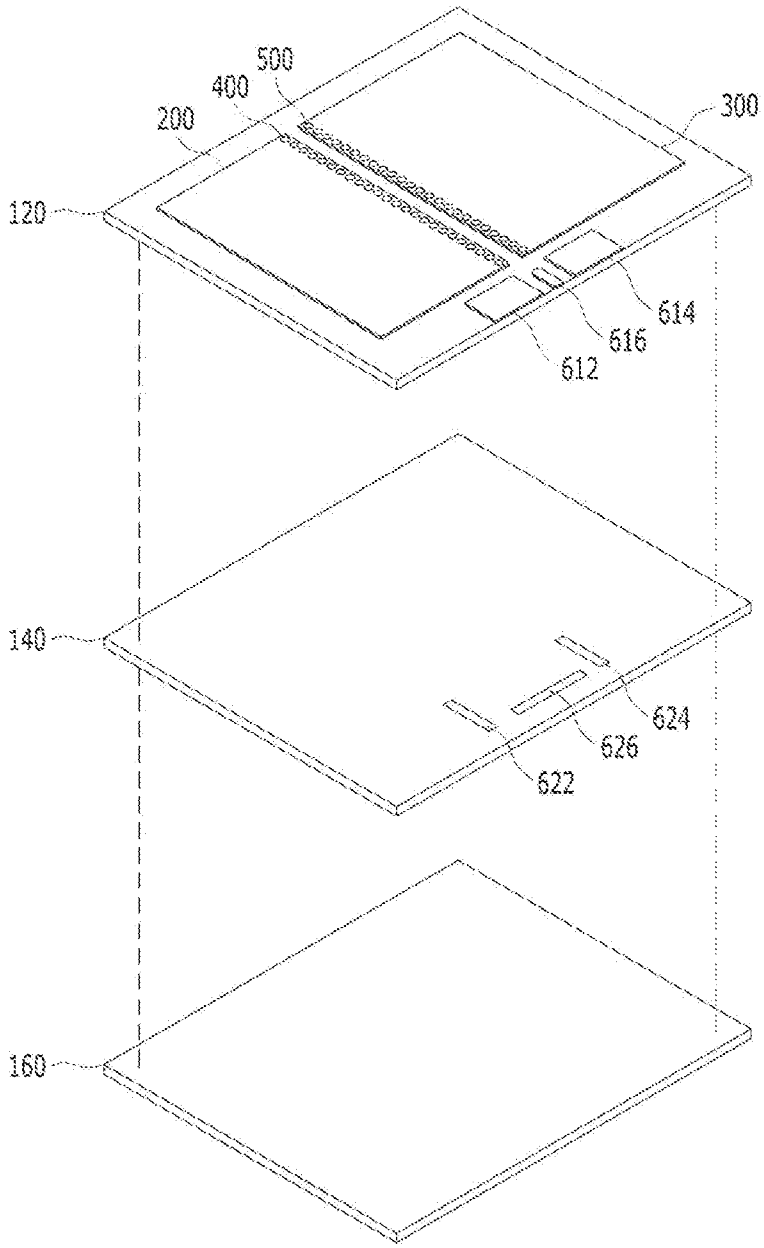

[FIG. 8]
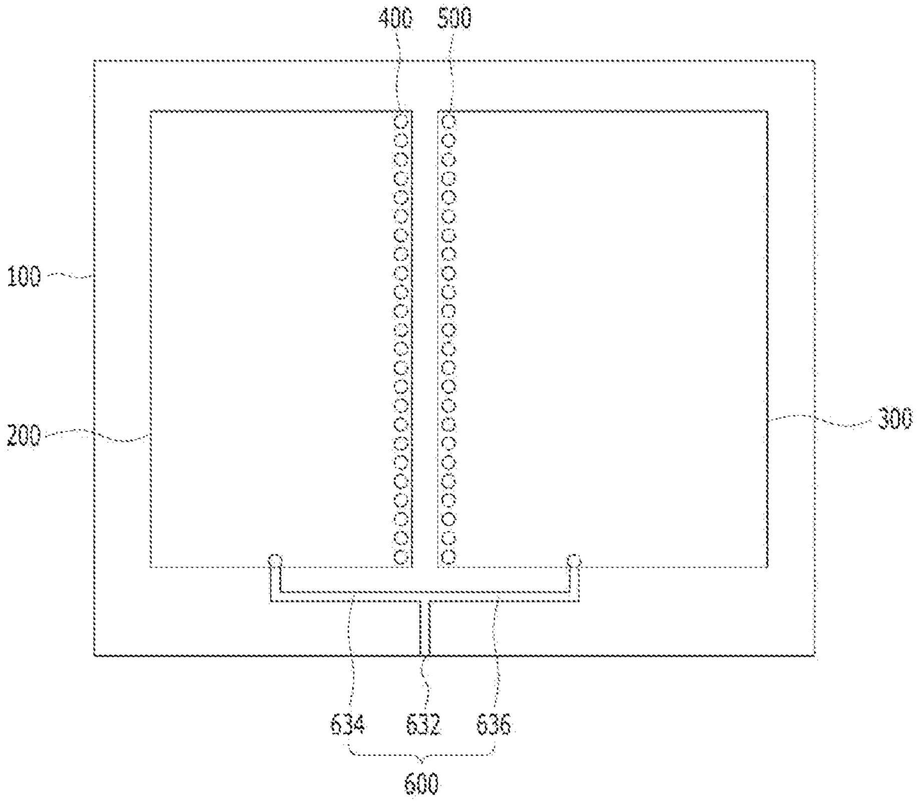
[FIG. 9]
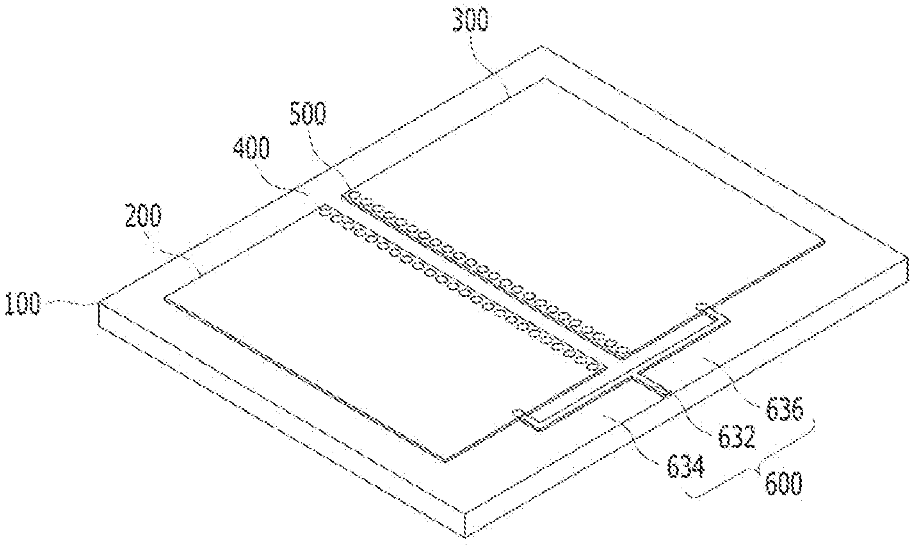

ANTENNA MODULE

TECHNICAL FIELD

The present disclosure relates to an antenna module.

BACKGROUND ART

In general, antennas resonating in two frequency bands are configured to include two radiation patterns. At this time, the two radiation patterns are disposed to be spaced apart from each other by a certain interval or more in order to prevent mutual interference.

However, when electronic devices on which the antenna is mounted are small, it is difficult to secure a separation interval between the radiation patterns because the size of the antenna is reduced. Accordingly, the conventional antennas have a problem in that the interference between the radiation patterns is generated, thereby degrading the characteristic of isolation.

SUMMARY OF INVENTION

Technical Problem

The present disclosure has been proposed to solve the above conventional problem, and an object of the present disclosure is to provide an antenna module, which forms a ground wall on two radiation patterns disposed adjacent to each other through a through-hole, thereby maximizing the characteristic of isolation between the radiation patterns.

Solution to Problem

In order to achieve the object, an antenna module according to an embodiment of the present disclosure includes a base substrate in which a ground is formed on a lower surface, a first radiation pattern disposed on an upper surface of the base substrate, a second radiation pattern disposed on an upper surface of the base substrate to be spaced apart from the first radiation pattern, a plurality of first through-holes penetrating the base substrate and the first radiation pattern and disposed in parallel with one side of the first radiation pattern facing the second radiation pattern, and a plurality of second through-holes penetrating the base substrate and the second radiation pattern and disposed in parallel with one side of the second radiation pattern facing the first radiation pattern. At this time, an area of the first radiation pattern is formed to be smaller than an area of the second radiation pattern.

The plurality of first through-holes electrically connect the first radiation pattern to the ground, and the plurality of second through-holes electrically connect the second radiation pattern to the ground.

The antenna module according to the embodiment of the present disclosure can further include a power feeding pattern disposed on the upper surface of the base substrate and electrically connected to the first radiation pattern and the second radiation pattern.

The power feeding pattern can include a first power feeding pattern electrically connected to the first radiation pattern, a second power feeding pattern electrically connected to the second radiation pattern, and a third power feeding pattern electrically connected to the first power feeding pattern and the second power feeding pattern.

At this time, the base substrate can include a first base substrate in which the first radiation pattern and the second radiation pattern are formed on an upper surface and a second base substrate disposed on a lower surface of the first base substrate, and the power feeding pattern can further include a first connection pattern disposed on the second base substrate to electrically connect the first radiation pattern and the first power feeding pattern, a second connection pattern disposed on the second base substrate to electrically connect the second radiation pattern and the second power feeding pattern, and a third connection pattern disposed on the second base substrate to electrically connect the first power feeding pattern and the second power feeding pattern. Here, the base substrate can further include a third base substrate disposed on a lower surface of the second base substrate and having a ground disposed on a lower surface.

Meanwhile, the power feeding pattern can also include a base part, a first branching part branched from the base part and electrically connected to the first radiation pattern, and a second branching part branched from the base part and electrically connected to the second radiation pattern.

Advantageous Effects of Invention

According to the present disclosure, the antenna module can form the ground wall on the two radiation patterns disposed adjacent to each other through the through-hole, thereby minimizing the interference between the radiation patterns to maximize the characteristic of isolation.

BRIEF DESCRIPTION OF DRAWINGS

FIGS. 1 to 3 are diagrams for describing an antenna module according to an embodiment of the present disclosure.

FIGS. 4 to 6 are diagrams for describing various modified examples of a first radiation pattern and a second radiation pattern of the antenna module according to the embodiment of the present disclosure.

FIGS. 7 to 9 are diagrams for describing a power feeding pattern of the antenna module according to the embodiment of the present disclosure.

DESCRIPTION OF EMBODIMENTS

Hereinafter, the most preferred embodiments of the present disclosure will be described with reference to the accompanying drawings in order to specifically describe the embodiments so that those skilled in the art to which the present disclosure pertains can easily implement the technical spirit of the present disclosure. First, in adding reference numerals to the components of each drawing, it should be noted that the same components have the same reference numerals as much as possible even if they are illustrated in different drawings. In addition, in describing the present disclosure, when it is determined that the detailed description of the related well-known configuration or function can obscure the gist of the present disclosure, the detailed description thereof will be omitted.

Referring to FIGS. 1 to 3, an antenna module according to a first embodiment of the present disclosure is configured to include a base substrate 100, a first radiation pattern 200, a second radiation pattern 300, a plurality of first through-holes 400, a plurality of second through-holes 500, and a power feeding pattern 600.

The base substrate 100 is a plate-shaped substrate having flexibility. The base substrate 100 is made of, for example, polyimide generally used in flexible printed circuit boards (FPCBs). As an example, the base substrate 100 is formed in a rectangular shape and has a first side surface SS1, a second side surface SS2, a third side surface SS3, and a fourth side surface SS4.

A lower surface of the base substrate 100 is configured as a ground GND. In other words, the lower surface of the base substrate 100 is formed with, for example, a ground layer made of a copper material. At this time, the ground GND is formed on the entire lower surface of the base substrate 100. Of course, the ground GND can also be formed on a part of the lower surface of the base substrate 100, and is formed to have a region at least overlapping with the plurality of first through-holes 400 and the plurality of second through-holes 500.

The first radiation pattern 200 is formed in a rectangular shape and is disposed on an upper surface of the base substrate 100. The first radiation pattern 200 is disposed adjacent to the third side surface SS3 on the upper surface of the base substrate 100. An area of the first radiation pattern 200 is formed to be smaller than an area of the second radiation pattern 300. Accordingly, the first radiation pattern 200 resonates with a signal of a higher frequency band than that of the second radiation pattern 300.

The second radiation pattern 300 is formed in a rectangular shape and is disposed on the upper surface of the base substrate 100. The second radiation pattern 300 is disposed adjacent to the fourth side surface SS4 on the upper surface of the base substrate 100. The area of the second radiation pattern 300 is formed to be larger than the area of the first radiation pattern 200. Accordingly, the second radiation pattern 300 resonates with a signal of a lower frequency band than that of the first radiation pattern 200.

As an example, the first radiation pattern 200 and the second radiation pattern 300 resonate with signals of 6 GHz and 8 GHz bands, respectively. Of course, when the size of the antenna module increases, the first radiation pattern 200 and the second radiation pattern 300 can also resonate with different frequency signals in a lower frequency band.

Meanwhile, referring to FIGS. 4 and 5, the first radiation pattern 200 and the second radiation pattern 300 can be formed in various shapes such as a semicircle and an oval. The first radiation pattern 200 and the second radiation pattern 300 can have the same shape, but can be formed to have different areas.

Referring to FIG. 6, the first radiation pattern 200 and the second radiation pattern 300 can also be formed in different shapes. In other words, the first radiation pattern 200 can be formed in a rectangular shape, and the second radiation pattern 300 can be formed in a polygonal shape, such as a semicircle or a circle, other than the rectangular shape.

As described above, as the first radiation pattern 200 and the second radiation pattern 300 are formed in the shape of a wide circle or a polygon, the directivity of the radiation pattern can be maximized.

The plurality of first through-holes 400 are formed by penetrating the first radiation pattern 200 and the base substrate 100. The plurality of first through-holes 400 are electrically connected to the first radiation pattern 200 and the ground GND formed on the lower surface of the base substrate 100.

The plurality of first through-holes 400 are formed on the first radiation pattern 200, but disposed side by side along one side of the first radiation pattern 200. The plurality of first through-holes 400 are disposed on one side of the first radiation pattern 200 facing the second radiation pattern 300.

As an example, the first radiation pattern 200 is formed in a rectangular shape having a first side S1, a second side S2, a third side S3, and a fourth side S4, and when the first side S1 is a side facing the second radiation pattern 300, the plurality of first through-holes 400 are disposed in parallel with the first side S1.

The plurality of second through-holes 500 are formed by penetrating the second radiation pattern 300 and the base substrate 100. The plurality of second through-holes 500 are electrically connected to the second radiation pattern 300 and the ground GND formed on the lower surface of the base substrate 100.

The plurality of second through-holes 500 are formed on the second radiation pattern 300, but disposed side by side along one side of the second radiation pattern 300. The plurality of second through-holes 500 are disposed on one side of the second radiation pattern 300 facing the first radiation pattern 200.

As an example, the second radiation pattern 300 is formed in a rectangular shape having a first side S1', a second side S2', a third side S3', and a fourth side S4', and when the first side S1' is a side facing the first radiation pattern 200, the plurality of second through-holes 500 are disposed in parallel with the first side S1'.

Meanwhile, as shown in FIG. 5, when a portion where the first radiation pattern 200 and the second radiation pattern 300 face has a round (arc) shape, only a part that does not satisfy a separation distance between the radiation patterns can also be formed with a through-hole (i.e., the first through-hole 400 and the second through-hole 500).

Since the interval between the first radiation pattern 200 and the second radiation pattern 300 is spaced apart from each other by about 1 mm and very narrow, the interference between the two radiation patterns increases, thereby degrading the characteristic of isolation.

According to the antenna module according to the embodiment of the present disclosure, as the first through-hole 400 and the second through-hole 500 that are adjacent to the side where the first radiation pattern 200 and the second radiation pattern 300 face each other and closely arranged are formed on the first radiation pattern 200 and the second radiation pattern 300, respectively, the plurality of first through-holes 400 and the plurality of second through-holes 500 can form a ground wall GW (GND wall) between the first radiation pattern 200 and the second radiation pattern 300, thereby maximizing the characteristic of isolation between the radiation patterns.

The power feeding pattern 600 is a pattern for connecting the first radiation pattern 200 and the second radiation pattern 300 to a feeding source (not shown), and is electrically connected to the first radiation pattern 200 and the second radiation pattern 300. As the power feeding pattern 600 is electrically connected to the first radiation pattern 200 and the second radiation pattern 300 resonating in different frequency bands, a dual-band antenna with a planar inverted F antenna (PIFA) resonating in two frequency bands can be configured.

The power feeding pattern 600 includes a first power feeding pattern 612 electrically connected to the first radiation pattern 200, a second power feeding pattern 614 electrically connected to the second radiation pattern 300, and a third power feeding pattern 616 electrically connected to the first power feeding pattern 612 and the second power feeding pattern 614.

At this time, referring to FIG. 7, it is assumed that the antenna module is configured as a stacked antenna in which a first base substrate 120, a second base substrate 140, and a third base substrate 160 are stacked.

The first power feeding pattern 612 is electrically connected to the first radiation pattern 200 through a first connection pattern 622 disposed on an upper surface of the second base substrate 140. At this time, the first connection pattern 622 is electrically connected to the first radiation pattern 200 and the first power feeding pattern 612 through a via hole (not shown) formed by penetrating the first base substrate 120.

The second power feeding pattern 614 is electrically connected to the second radiation pattern 300 through a second connection pattern 624 disposed on the upper surface of the second base substrate 140. At this time, the second connection pattern 624 is electrically connected to the second radiation pattern 300 and the second power feeding pattern 614 through a via hole (not shown) formed by penetrating the first base substrate 120.

The third power feeding pattern 616 is electrically connected to the first power feeding pattern 612 and the second power feeding pattern 614 through a third connection pattern 626 disposed on the upper surface of the second base substrate 140. At this time, the third power feeding pattern 616 is electrically connected to the first power feeding pattern 612 and the second power feeding pattern 614 through a via hole (not shown) formed by penetrating the first base substrate 120.

Referring to FIGS. 8 and 9, when the antenna module is composed of only one base substrate 100, the power feeding pattern 600 can be composed of a base part 632 connected to a feeding source (not shown), a first branching part 634 branched from the base part 632 and electrically connected to the first radiation pattern 200, and a second branching part 636 branched from the base part 632 and electrically connected to the second radiation pattern 300. At this time, the base part 632, the first branch part 634, and the second branch part 636 can be integrally formed.

Although the preferred embodiments of the present disclosure have been described above, it is understood that the present disclosure can be modified in various forms, and those skilled in the art can practice various modified examples and changed examples without departing from the scope of the claims of the present disclosure.

The invention claimed is:

1. An antenna module comprising:

a base substrate in which a ground is formed on a lower surface;

a first radiation pattern disposed on an upper surface of the base substrate;

a second radiation pattern disposed on the upper surface of the base substrate to be spaced apart from the first radiation pattern;

a plurality of first through-holes penetrating the base substrate and the first radiation pattern and disposed in parallel with one side of the first radiation pattern facing the second radiation pattern; and a plurality of second through-holes penetrating the base substrate and the second radiation pattern and disposed in parallel with one side of the second radiation pattern facing the first radiation pattern.

2. The antenna module of claim 1, wherein an area of the first radiation pattern is formed to be smaller than an area of the second radiation pattern.

3. The antenna module of claim 1, wherein the plurality of first through-holes electrically connect the first radiation pattern to the ground.

4. The antenna module of claim 1, wherein the plurality of second through-holes electrically connect the second radiation pattern to the ground.

5. The antenna module of claim 1, further comprising: a power feeding pattern disposed on the upper surface of the base substrate and electrically connected to the first radiation pattern and the second radiation pattern.

6. The antenna module of claim 5, wherein the power feeding pattern comprises a first power feeding pattern electrically connected to the first radiation pattern;

a second power feeding pattern electrically connected to the second radiation pattern; and a third power feeding pattern electrically connected to the first power feeding pattern and the second power feeding pattern.

7. The antenna module of claim 6, wherein the base substrate comprises a first base substrate in which the first radiation pattern and the second radiation pattern are formed on an upper surface; and a second base substrate disposed on a lower surface of the first base substrate.

8. The antenna module of claim 7, wherein the power feeding pattern further comprises a first connection pattern disposed on the second base substrate to electrically connect the first radiation pattern and the first power feeding pattern;

a second connection pattern disposed on the second base substrate to electrically connect the second radiation pattern and the second power feeding pattern; and a third connection pattern disposed on the second base substrate to electrically connect the first power feeding pattern and the second power feeding pattern.

9. The antenna module of claim 7, wherein the base substrate further comprises a third base substrate disposed on a lower surface of the second base substrate and having a ground disposed on a lower surface.

10. The antenna module of claim 5, wherein the power feeding pattern comprises a base part;

a first branching part branched from the base part and electrically connected to the first radiation pattern; and a second branching part branched from the base part and electrically connected to the second radiation pattern.

* * * * *